(12) United States Patent
Song

(10) Patent No.: US 7,823,988 B2
(45) Date of Patent: Nov. 2, 2010

(54) CRAWLER WITHOUT STEEL CORES

(75) Inventor: In-Hyuk Song, Daejeon (KR)

(73) Assignee: Camoplast Korea Ltd., Daejeon (KR)

( * ) Notice: Subject to any disclaimer, the term of this patent is extended or adjusted under 35 U.S.C. 154(b) by 288 days.

(21) Appl. No.: 11/664,014

(22) PCT Filed: Sep. 26, 2005

(86) PCT No.: PCT/KR2005/003189

§ 371 (c)(1),
(2), (4) Date: Aug. 7, 2008

(87) PCT Pub. No.: WO2006/080651

PCT Pub. Date: Aug. 3, 2006

(65) Prior Publication Data

US 2009/0079260 A1 Mar. 26, 2009

(30) Foreign Application Priority Data

Oct. 29, 2004 (KR) .................. 10-2004-0087293

(51) Int. Cl.
*B62D 55/253* (2006.01)
(52) U.S. Cl. ...................... 305/170; 305/167
(58) Field of Classification Search ............... 305/157, 305/160, 165, 166, 167, 170, 178, 179, 185
See application file for complete search history.

(56) References Cited

U.S. PATENT DOCUMENTS

| | | | | |
|---|---|---|---|---|
| 4,721,498 A | * | 1/1988 | Grob | ........................ 474/261 |
| 6,722,746 B2 | | 4/2004 | Katayama et al. | |
| 6,742,852 B2 | | 6/2004 | Tsuru et al. | |
| 6,764,143 B2 | * | 7/2004 | Peterson et al. | ............. 305/165 |
| 6,843,539 B2 | * | 1/2005 | Tsuru | ......................... 305/170 |
| 7,083,242 B2 | * | 8/2006 | Piou et al. | .................... 305/167 |
| 7,438,778 B2 | * | 10/2008 | Tsuru | ......................... 156/159 |
| 2004/0195915 A1 | * | 10/2004 | Sugihara et al. | ............. 305/165 |

FOREIGN PATENT DOCUMENTS

| | | | |
|---|---|---|---|
| JP | 2001-010556 | | 1/2001 |
| JP | 2001-018863 | | 1/2001 |
| JP | 2002178965 A | * | 6/2002 |
| KR | 1020010074321 | | 8/2001 |

OTHER PUBLICATIONS

International Search Report for PCT application No. PCT/KR2005/003189 dated Dec. 20, 2005.
Written Opinion for PCT application No. PCT/KR2005/003189 dated Dec. 20, 2005.

* cited by examiner

*Primary Examiner*—S. Joseph Morano
*Assistant Examiner*—Kip T Kotter
(74) *Attorney, Agent, or Firm*—Jenkins, Wilson, Taylor & Hunt, P.A.

(57) ABSTRACT

The present invention relates to a crawler without steel cores (hereinafter referred to as "coreless crawler"), which is used for transporting the caterpillar vehicles for construction, civil engineering, agricultural use or the like. More particularly this invention relates to a coreless crawler for preventing the crawler body from being separated from a wheel or sprocket and the guide roller from riding the guide projection formed on the inward surface of the crawler, by disposing a pair of separation preventing steel cords having an oblique angle, symmetrically with respect to the center portion in the direction of driving so as to balance the deflection forces, thereby extending the lifetime of the crawler product.

6 Claims, 3 Drawing Sheets

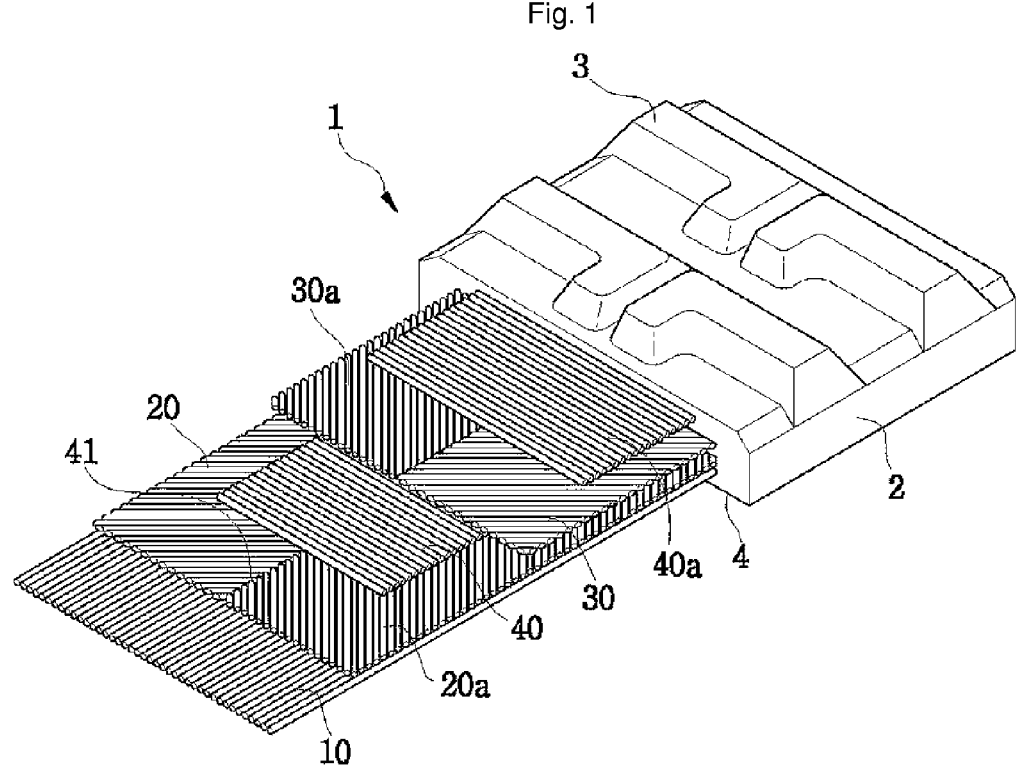
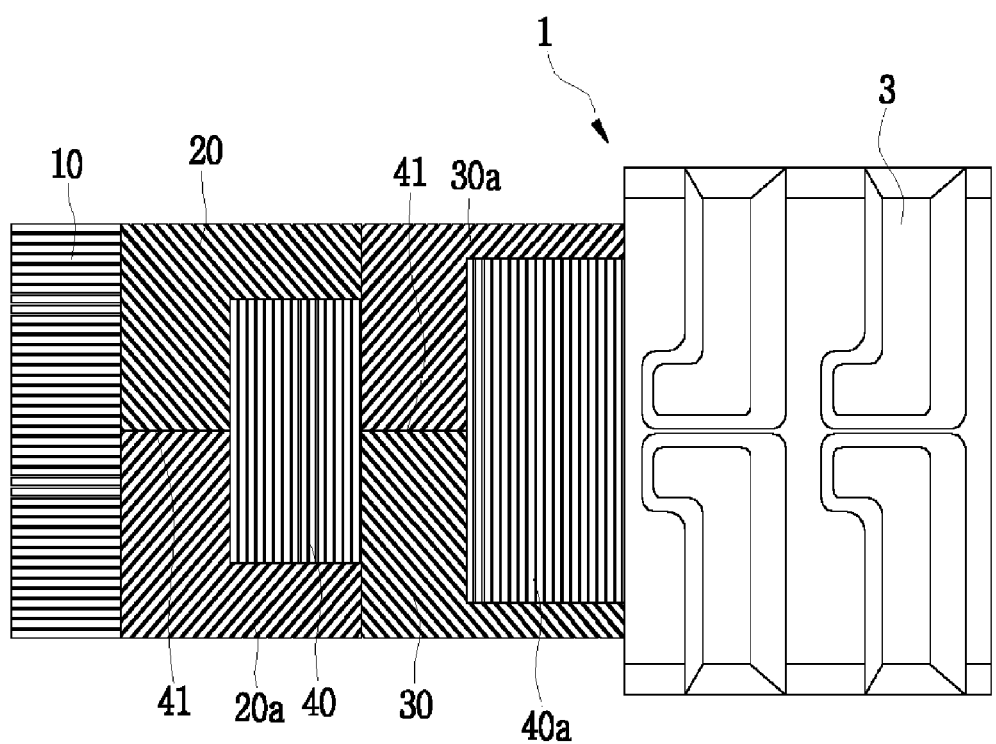

CRAWLER WITHOUT STEEL CORES

TECHNICAL FIELD

The present invention relates to a crawler without steel cores (hereinafter referred to as "coreless crawler"), which is used for transporting the caterpillar vehicles for construction, civil engineering, agricultural use or the like. More particularly this invention relates to a coreless crawler for preventing the crawler body from being separated from a wheel or sprocket and the guide roller from riding the guide projection formed on the inward surface of the crawler, by disposing a pair of separation preventing steel cords having an oblique angle, symmetrically with respect to the center portion in the direction of driving so as to balance the deflection forces, thereby extending the lifetime of the crawler product.

BACKGROUND ART

A conventional crawler is suspended between a driving sprocket and an idler, and is given the forwarding force by the driving sprocket's rotation.

The respective teeth of the driving sprocket are inserted in sprocket pits formed continually at the center of a crawler at regular intervals. Conventionally, since the crawler is made from rubber material so that the spaces between the sprocket pits are easily broken, the crawler cannot fulfill the duty of smoothly transferring the driving power.

To avoid this problem, conventionally, steel cores have been inserted between the respective sprocket pits so that smooth driving could be achieved, and guide rollers, which has been equipped at the outer side of guide projections formed at the cores, have prevented the crawler from leaving the driving sprocket and the idler during the operation of the crawler.

However, when the conventional crawler, in which steel cores are included, is destroyed by fire for disposal, the cores do not burn up, and this causes additional rework for disposal. Further, the increased weight of the crawler due to the cores reduces the fuel efficiency, and the separation occurs more frequently than a general sprocket-driving type.

In addition, since the friction between the metallic sprocket and the steel cores accelerates the abrasion, the lifetime of the product becomes short.

Accordingly, to avoid such problems occurring when using a conventional crawler with steel cores, configurations employing a coreless crawler were developed.

Since the prior art patent does not employ steel cores at all, the disposal can become easier and the weight is reduced, thereby improving fuel-efficiency. Since the patent uses a helical gear type driving mechanism, the capability of power transmission can be improved and the frictional abrasion can be remarkably reduced, thereby lifetime of the crawler being extended.

However, even though the prior art patent has the above advantages, it cannot avoid separation of the crawler because the deflection force, which is a common phenomenon for every crawler, is still generated. Since the crawler is operated as it is being deflected, like in FIG. 5, guide rollers, disposed at the sides of guide projections 5 formed on an inward surface of the crawler body, may rid the guide projections 5, thereby accumulating excessive strains to the crawler and lifetime of the crawler being reduced.

DISCLOSURE OF INVENTION

Technical Problem

Therefore, the present invention has been made to solve the above-mentioned problems involved in the conventional coreless crawler, and it is an object of the present invention to provide a coreless crawler in which symmetrically disposed separation preventing steel cords, having the same oblique angle with respect to the center portion in the driving direction of the crawler, suppress the generation of the deflection force and balance the deflection forces unbalancedly functioning laterally, thereby eradicating separation of the crawler.

It is another object of the present invention to provide a coreless crawler in which separation preventing steel cords, having different oblique angles with respect to the center portion in the driving direction of the crawler, balance the deflection forces unbalancedly functioning laterally, thereby eradicating separation of the crawler.

It is yet another object of the present invention is to provide a coreless crawler, in which, by suppressing the deflection forces, the guide roller is prevented from riding the guide projection formed on the inward surface of the crawler, the lifetime of the crawler is remarkably extended, the oscillation is reduced, and the driving condition is improved, thereby the driver's fatigue being lessened.

Technical Solution

To achieve the above objects, according to the present invention, there is provided a crawler without steel cores having a plurality of lugs formed on an outward surface of a crawler body so that they come into contact with the ground; a plurality of guide projections formed on an inward surface of the body at regular intervals, the crawler including: a plurality of main steel cords inserted inside the crawler body, closer to the inward surface and are aligned in the longitudinal direction; a plurality of inner separation preventing steel cords layered on the main steel cords, each of which has laterally an oblique angle with respect to a center portion in the direction of driving; and a plurality of outer separation preventing steel cords layered on the inner separation preventing steel cords, each of which laterally has an oblique angle with respect to a center portion in the direction of driving.

ADVANTAGEOUS EFFECTS

According to the present invention, the symmetrically disposed separation preventing steel cords, having the same oblique angle with respect to the center portion in the driving direction of the crawler, suppress the generation of the deflection force and balance the deflection forces unbalancedly functioning laterally, thereby eradicating separation of the crawler.

In addition, by suppressing the deflection forces, the guide roller is prevented from riding the guide projection formed on the inward surface of the crawler, the lifetime of the crawler is remarkably extended, the oscillation is reduced, and the driving condition is improved, thereby the driver's fatigue being greatly lessened.

BRIEF DESCRIPTION OF THE DRAWINGS

The above and other objects, features, and advantages of the present invention will become more apparent from the following description when taken in conjunction with the accompanying drawings, in which:

FIG. 1 is a partial cutaway perspective view showing one embodiment of a crawler to which the present invention is adapted, FIG. 2 is a partial cutaway plan view of the present invention.

BRIEF DESCRIPTION OF REFERENCE NUMBER

Figure 3:
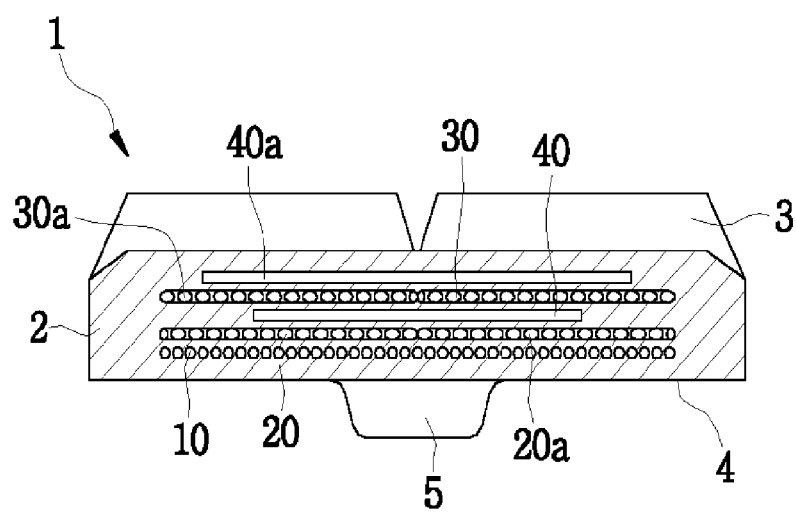
FIG. 3 is a cross-section view showing the internal structure of a crawler.

2: crawler body 10: main steel cord
20, 20a: the first and second inner separation preventing steel cord
30, 30a: the first and second outer separation preventing steel cord
40, 40a: reinforcing cord

BEST MODE FOR CARRYING OUT THE INVENTION

Hereinafter, preferred embodiments of the present invention will be described in detail with reference to the attached drawings.

Basically, a crawler according to the present invention does not include steel cores, and therefore, the problems that the conventional crawler with steel cores has had can be eradicated. In addition, since the present invention employs various forms of steel cords inserted in the crawler body, the steel cords effectively suppress the deflection force generation that every crawler 1 have commonly had, and balance minute part of the deflection force functioning laterally, so that separation of the crawler can be essentially prevented.

With reference to FIG. 1, the basic construction of a coreless crawler 1 according to the present invention includes a plurality of lugs 3 formed on an outward surface of a crawler body 2 so that they come into contact with the ground; a plurality of guide projections 5 arrayed on an inward surface of the body 2.

Additionally, the coreless crawler 1 according to the present invention includes a plurality of main steel cords 10 inserted inside the crawler body 2, closer to the inward surface and are aligned in the longitudinal direction; first and second inner separation preventing steel cords 20, 20a layered on the main steel cords 10, each of which has laterally an oblique angle with respect to a center portion in the direction of driving (i.e., in the longitudinal direction of crawler 1); and first and second outer separation preventing steel cords 30, 30a layered on the first and second inner separation preventing steel cords 20, 20a, each of which laterally has an oblique angle with respect to a center portion in the direction of driving.

More detailed explanation for helping easier implementation of the present invention will follow.

The plurality of main steel cords 10 are inserted inside the crawler 1, closer to the inward surface 4 (the lower position in FIG. 1) and are aligned in the longitudinal direction. The main steel cords 10 play a role in determining a total length of the crawler body 2, i.e., the caterpillar.

The first and second inner separation preventing steel cords 20, 20a layered on the main steel cords 10 form a pair, each of which has an oblique angle laterally with respect to the center portion in the driving direction (see FIG. 1 and FIG. 2). The pair of first and second inner separation preventing steel cords 20, 20a suppresses the deflection force inclining to either one side to make separation when the crawler is driven, so that the separation of the crawler can be effectively prevented.

It is desirable that each of the first and second inner separation preventing steel cords 20, 20a is disposed symmetrically with respect to a center portion in the driving direction, in order to balance the deflection forces unbalancedly functioning in the lateral direction.

In addition, in order to increase the suppression of the deflection force, a plurality of first and second outer separation preventing steel cords 30, 30a are layered on the first and second inner separation preventing steel cords 20, 20a, which have an oblique angle symmetrically with respect to a center portion in the direction of driving.

Here, the first and second inner separation preventing steel cords 20, 20a and first and second outer separation preventing steel cords 30, 30a are symmetrically disposed, respectively, so that the oblique angles are symmetrical with respect to a line that is transverse to the longitudinal direction of crawler 1, in order to be balanced in the direction of driving.

Specifically, referring to FIG. 1 and FIG. 2, the first and second inner separation preventing steel cords 20, 20a are disposed so that the slant converges on the rear, while the corresponding first and second outer separation preventing steel cords 30, 30a are disposed so that the slant diverges into the rear. By doing so, the deflection forces unbalancedly functioning to the respective steel cord layers get balanced, and so the separation of the crawler can be prevented beforehand. Accordingly, it is desirable that they are disposed symmetrically to each other with respect to a line that is transverse to the longitudinal direction.

Additionally, a plurality of reinforcing cords 40 are inserted between the first and second inner separation preventing steel cords 20, 20a and the first and second outer separation preventing steel cords 30, 30a, along the central contact line 41, in the transverse directions.

The reinforcing cords 40 are disposed perpendicularly to the driving direction of the crawler 1, continually along the central contact line 41. The cords 40 reinforce the lateral tension of the crawler 1, and prevent the first and second inner separation preventing steel cords 20, 20a and the first and second outer separation preventing steel cords 30, 30a from tearing along the contact line 41 respectively, thereby enhancing the durability of the crawler 1.

Further, a plurality of reinforcing cords 40a is layered on the first and second outer separation preventing steel cords 30, 30a along the contact line 41, in the transverse directions. This also reinforces the lateral tension of the crawler 1 and prevents the contact line 41 from tearing.

The reinforcing cords 40, 40a may be made from polyester, nylon, aramide, Kevlar, etc., as well as a commonly used steel cord.

Figure 4:
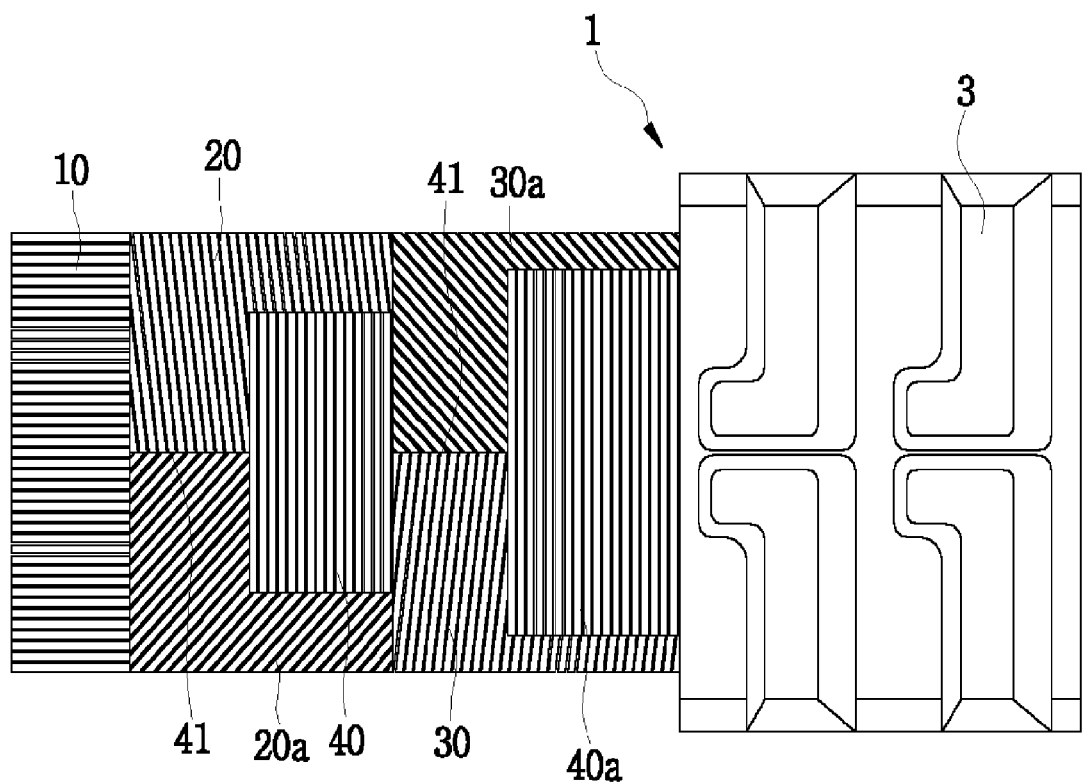
FIG. 4 is a partial cutaway plan view showing another embodiment of the present invention, and FIG. 5 partially shows the inward surface of a crawler according to the present invention.
Figure 5:
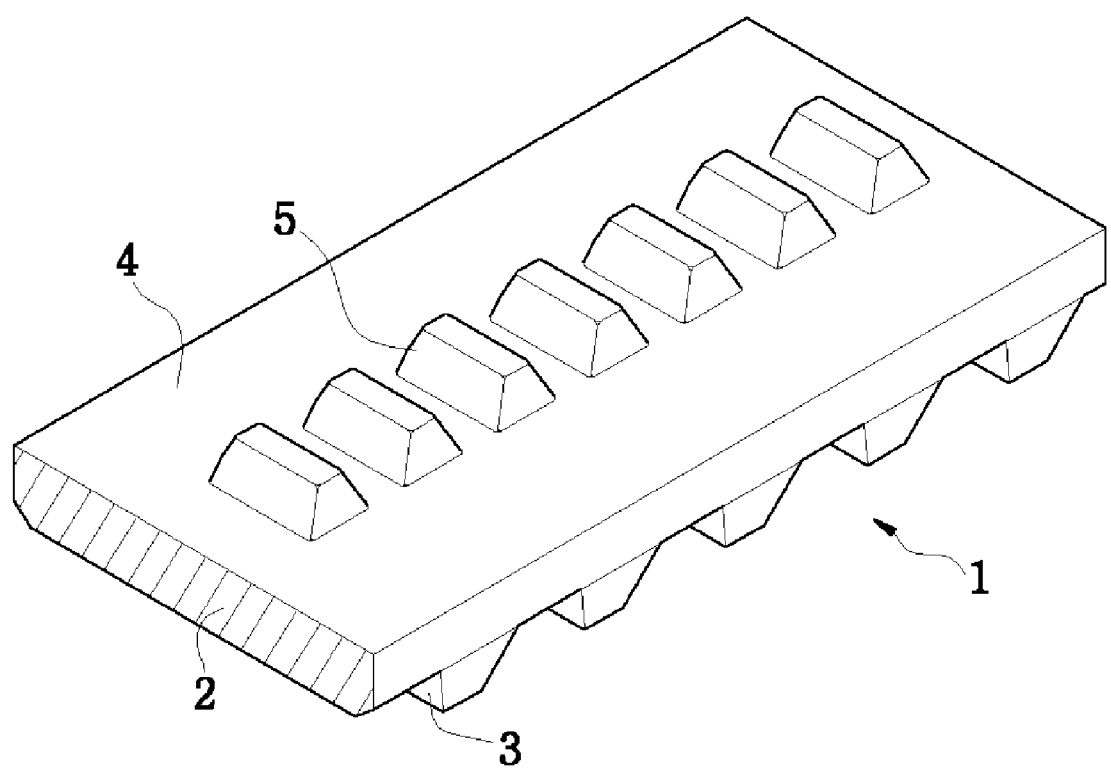

In the mean time, FIG. 4 shows another embodiment of the present invention. Unlike the aforementioned inner and outer separation preventing steel cords 20, 20a, 30, 30a which are disposed symmetrically with respect to the center portion in the driving direction, this embodiment shows that they are disposed with different oblique angles respectively.

Even though they have different oblique angles to one another, the first inner separation preventing steel cords 20 and the first outer separation preventing steel cords 30 are disposed symmetrically, and the second inner separation preventing steel cords 20*a* and the second outer separation preventing steel cords 30*a* are disposed symmetrically. By doing so, the unbalanced deflection forces functioning to the respective steel cord layers can be compensated for, totally.

That is to say, although the first and second inner separation preventing steel cords 20, 20*a* have the different oblique angles and so the deflection forces functioning to them becomes unbalanced, since first inner separation preventing steel cords 20 and first outer separation preventing steel cords 30 are symmetrical and second inner separation preventing steel cords 20*a* and second outer separation preventing steel cords 30*a* are symmetrical, unbalance of the net deflection forces generated from the respective steel cord layers are properly balanced, thereby rooting up the separation of the crawler 1.

From the foregoing, according to the coreless crawler of the present invention, the first and second inner separation preventing steel cords 20, 20*a* and the first and second outer separation preventing steel cords 30, 30*a*, which are inserted slantly inside the crawler body 2, efficiently suppress the deflection force generation when the crawler is used for a transporting means for a variety of caterpillar vehicles, and balance the deflection forces unbalancedly functioning laterally, thereby preventing the track from being separated.

Accordingly, the phenomenon that the guide roller is put on the guide projection 5 formed on the inward surface 4 of the crawler 1 and the crawler is broken by the excessive shock and stress, can be effectively avoided. Therefore, the lifetime of the crawler can be remarkably extended, the fatigue to the driver or operator can be lessened due to little vibration, and the excellent driving condition can be provided.

The invention claimed is:

1. A crawler without steel cores having a plurality of lugs (3) formed on an outward surface of a crawler body (2) so that they come into contact with the ground; a plurality of guide projections (5) formed on an inward surface of the body (2) at regular intervals, the crawler comprising:

a plurality of main steel cords (10) inserted inside the crawler body (2), closer to the inward surface and aligned in a longitudinal direction of the crawler body;

first and second inner separation preventing steel cords (20, 20*a*) disposed adjacent to one another to form a first layer on the main steel cords (10), each of which has laterally an oblique angle with respect to a center portion in the longitudinal direction, the first and second inner separation preventing steel cords being disposed with different oblique angles with respect to the center portion in the longitudinal direction; and first and second outer separation preventing steel cords (30, 30*a*) disposed adjacent to one another to form a second layer on the first and second inner separation preventing steel cords (20, 20*a*), each of which laterally has an oblique angle with respect to a center portion in the longitudinal direction, the first and second outer separation preventing steel cords being disposed with different oblique angles with respect to the center portion in the longitudinal direction.

2. The crawler according to claim 1, wherein the first and second inner separation preventing steel cords (20, 20*a*) and the first and second outer separation preventing steel cords (30, 30*a*) are symmetrically disposed, respectively, with respect to the center portion in the longitudinal direction, and the first and second inner separation preventing steel cords (20, 20*a*) are symmetrically disposed to the first and second outer separation preventing steel cords (30, 30*a*) with respect to a line that is transverse to the longitudinal direction.

3. The crawler according to claim 1, wherein the first inner separation preventing steel cords (20) and the first outer separation preventing steel cords (30) are disposed symmetrically with respect to the center portion, and wherein the second inner separation preventing steel cords (20*a*) and the second outer separation preventing steel cords (30*a*) are disposed symmetrically with respect to the center portion.

4. The crawler according to claim 3, wherein the first inner separation preventing steel cords (20) and the first outer separation preventing steel cords (30) are disposed symmetrically, and the second inner separation preventing steel cords (20*a*) and the second outer separation preventing steel cords (30*a*) are disposed symmetrically, whereby deflection forces unbalancedly functioning to the respective first and second separation preventing steel cords can be balanced to prevent the crawler separation.

5. The crawler according to claim 1, further comprising:

a plurality of reinforcing cords (40) inserted between the first and second inner separation preventing steel cords (20, 20*a*) and the first and second outer separation preventing steel cords (30, 30*a*) along the center portion in directions transverse to the longitudinal direction, the reinforcing cords (40) reinforcing the lateral tension of the crawler and preventing the contact line's (41) tearing.

6. The crawler according to claim 1, further comprising:

a plurality of reinforcing cords (40*a*) layered on the first and second outer separation preventing steel cords (30, 30*a*) along the center portion, in directions transverse to the longitudinal direction, the reinforcing cords (40*a*) reinforcing the lateral tension of the crawler and preventing the contact line (41) from tearing.

\* \* \* \* \*